United States Patent [19]

Crabtree et al.

[11] Patent Number: 4,476,285

[45] Date of Patent: Oct. 9, 1984

[54] RUBBER MODIFIED EPOXY ADHESIVE

[75] Inventors: David J. Crabtree, Solvang; Elizabeth Y. Park, Los Angeles, both of Calif.

[73] Assignee: The United States of America as represented by the Secretary of the Navy, Washington, D.C.

[21] Appl. No.: 471,417

[22] Filed: Mar. 2, 1983

[51] Int. Cl.³ .................. C08L 63/00; C08L 63/08
[52] U.S. Cl. ................................. 525/113; 525/119
[58] Field of Search .......................... 525/113, 119

[56] References Cited

U.S. PATENT DOCUMENTS

| | | | |
|---|---|---|---|
| 2,858,291 | 10/1958 | McAdam | 525/122 |
| 3,678,131 | 7/1972 | Klapprott et al. | 525/109 |
| 3,707,583 | 12/1972 | McKown | 427/27 |
| 3,823,107 | 7/1974 | Cotton | 524/384 |
| 3,859,239 | 1/1975 | Van Gils | 525/119 |
| 3,892,819 | 7/1975 | Najvar | 525/119 |
| 3,894,113 | 7/1975 | Pagel | 428/107 |
| 3,926,903 | 12/1975 | Scola | 523/437 |

FOREIGN PATENT DOCUMENTS

| | | | |
|---|---|---|---|
| 999383 | 7/1965 | United Kingdom | 523/119 |
| 653282 | 3/1979 | U.S.S.R. | 523/113 |
| 696038 | 11/1979 | U.S.S.R. | 523/119 |

Primary Examiner—Allan M. Lieberman
Attorney, Agent, or Firm—Robert F. Beers; Henry Hansen; Armand M. Vozzo, Jr.

[57] ABSTRACT

A rubber-modified epoxy adhesive and the method of making the same is disclosed for use in bonding graphite-epoxy composite structures. The adhesive comprises a two-part formulation, one part being a reaction product of a carboxyl terminated reactive liquid rubber prereacted with a bisphenol A epoxy resin so that linear epoxy-rubber chains are developed. The second part of the adhesive is an amine curing agent. One effective example of the adhesive is formulated as follows: approximately 4 parts by weight of the bisphenol A epoxy resin is mixed per part of a carboxyl terminated butadiene acrylonitrile rubber and heated to 170° C. At 160° C., a catalyst of approximately 0.01 parts by weight of triphenyl phosphene per part of the rubber is added and the mixture stirred for one hour at 170°–175° C. to provide the reaction product. After cooling to room temperature, the reaction product may be packaged in premeasured quantities for mixture, when required, with a curing agent of cycloaliphatic diamine at a ratio of approximately 4:1.

8 Claims, No Drawings

RUBBER MODIFIED EPOXY ADHESIVE

STATEMENT OF GOVERNMENT INTEREST

The invention described herein may be manufactured and used by or for the Government of the United States of American for governmental purposes without the payment of any royalties thereon or therefor.

BACKGROUND OF THE INVENTION

The present invention relates to structural adhesives and more particularly to an improved rubber-modified epoxy adhesive and method of making the same for use in repairing damaged areas of graphite-epoxy composite structures.

In the construction of today's aircraft, particularly those of the military, an increasing amount of advanced composite materials are being utilized to produce relatively strong, lightweight structural members. Most typically having an epoxy resin base impregnated with graphite fibers, these advanced composite materials and the structural members fabricated thereof develop damaged areas during flight operations and routine flight service that require immediate repair. The quick, effective repair of such damaged areas is of critical importance to the safe operation of the aircraft and as a result, the development of reliable measures of repairing the damaged composite structure has become an essential area of concern.

One current method of repair is the adhesive bonding of a patch of the graphite-epoxy composite material over the damaged area. While this method of patch-bonding has had some promising results, there remains a need for developing and selecting an adhesive to make such patch-bonding repairs with higher strength and greater ease. Epoxy film adhesives used initially to fabricate the composite structures have been relatively successful. However, these film adhesives have required refrigerated storage to avoid premature curing, and in those field locations most typically performing patch-bonding repairs, such as on board aircraft carriers, such refrigerated storage has been difficult to provide. Furthermore, because of working space limitations at these field locations, constraints have been placed on the time, temperature, and pressure conditions for adhesive cure.

SUMMARY OF THE INVENTION

Accordingly, it is a general purpose and object of the present invention to provide an improved adhesive composition for repairing damaged graphite-epoxy composite structures, particularly those of aircraft.

A further object of the present invention is to provide an adhesive that can be easily mixed and applied in the field for effectively patch-bonding damaged areas of graphite-epoxy composite structures.

A still further object of the present invention is to provide a bonding adhesive for graphite-epoxy composites that has an extended shelf life, of at least one year, without requiring refrigeration.

Another object of the present invention is to provide an adhesive composition cured under limited conditions of time, temperature and pressure without the use of curing equipment which is difficult or dangerous to use.

Still another object of the present invention is to provide an adhesive composition that, in its cured state, is thermally stable, environmentally durable, and possessed of sufficient mechanical properties, such as modulus, tensile strength, and fracture toughness, to function as a load transfer medium in the repair of joints of graphite-epoxy composites.

Briefly, these and other objects of the present invention are accomplished by a rubber-modified epoxy adhesive and the method of making the same for use in bonding graphite-epoxy composite structures. The adhesive comprises a two-part formulation, one part being a reaction product of a carboxyl terminated reactive liquid rubber prereacted with a bisphenol A epoxy resin so that linear epoxy-rubber chains are developed. The second part of the adhesive is an amine curing agent.

One effective example of the adhesive is formulated as follows: approximately 4 parts by weight of the bisphenol A epoxy resin in mixed per part of a carboxyl terminated butadiene acrylonitrile rubber and heated to 170° C. At 160° C., a catalyst of approximately 0.01 parts by weight of triphenyl phosphene per part of the rubber is added and the mixture stirred for one hour at 170°-175° C. to provide the reaction product. After cooling to room temperature, the reaction product may be packaged in premeasured quantities for mixture, when required, with a curing agent of cycloaliphatic diamine at a ratio of approximately 4:1.

Other objects, advantages and novel features of the present invention will become apparent from the following detailed description thereof.

DESCRIPTION OF THE PREFERRED EMBODIMENT

In accordance with the present invention, the adhesive is initially formulated using a bisphenol A epoxy resin, such as Epon 828 manufactured by the Shell Oil Company, which resin is modified preferably by prereaction with a carboxyl terminated butadiene rubber. The rubber containing free carboxyl groups on the ends of the polymer chain reacts with the epoxy resin to produce linear epoxy-rubber chains that improve the adhesive qualities of the epoxy. The carboxyl terminated rubber employed in the present adhesive formulation is a butadiene-acrylonitrile copolymer having the following idealized structural formula:

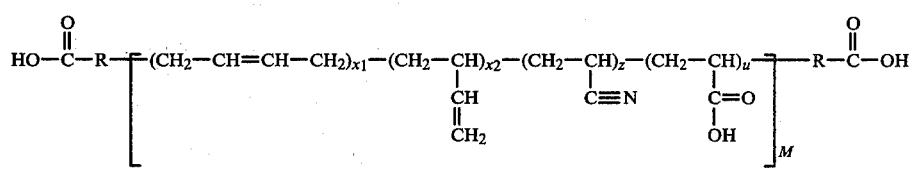

Such a butadiene-acrylonitrile copolymer suitable for inclusion in the adhesive formulation is CTBN liquid rubber manufactured by the B. F. Goodrich Company, a particularly effective type being CTBN 1300X8. An amine terminated rubber may be employed in the adhesive formulation in the place of the carboxyl terminated rubber. Such an alternative rubber is a reactive liquid copolymer of butadiene and acrylonitrile with terminal cycloaliphatic secondary amine groups, having the following idealized chemical structure:

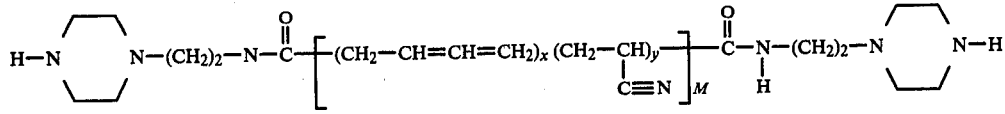

One suitable such amine terminated rubber for inclusion in the adhesive formulation is ATBN 1300X16 manufactured by the B. F. Goodrich Company.

The reaction occuring between the terminal carboxyl group of the rubber and epoxide group of the resin results in chain extension and is represented as follows:

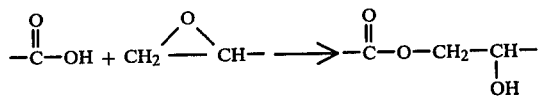

The extended products form microscopic domains of epoxy-rubber adducts which serve to toughen an otherwise brittle epoxy matrix. A catalyst, such as triphenyl phosphene, may be used to accelerate the carboxyl-epoxide reaction. It is further noted that the above-described epoxy-rubber reaction product may be mixed with an additional epoxy resin, specifically that of a tri- or tetrafunctional epoxy to increase the thermal stability of the adhesive formulation.

In accordance with the present invention, an amine curing agent is added to the epoxy-rubber reaction product, as prepared above, for purposes of hardening the adhesive. The amine curing agent most effectively employed in the present formulation is a cycloaliphatic diamine composed of bis (p-amine-cyclohexyl) methane isomers and having the following chemical structure:

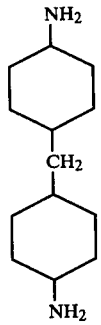

A suitable cycloaliphatic diamine for curing the present adhesive formulation is PACM-20, manufactured by the DuPont Company. An aromatic amine may alternatively be used as the curing agent in the present formulation, one suitable such aromatic amine being Epon Z made by the Shell Oil Company. Another aromatic amine that may be used as a curing agent is a metaphenylene diamine, commercially known as MPDA, mixed with the epoxy resin to form an adduct fluid at room temperature.

Evaluation of adhesives formulated according to the present invention was conducted using conventional instrumental analyses to determine the cure characteristics. Differential Scanning Calorimetry (DSC) was used to determine temperature at which cure occurs, the rate of cure at various temperatures, the degree of cure obtained, the melting or softening temperature of partially cured polymers, and the glass transition temperature of cured polymers. Thermomechanical Analysis (TMA) was used to determine the softening temperature and glass transition temperatures of the polymers.

Tensile lap shear strength tests were performed using aluminum lap shear tensile coupons to further evaluate the bonding characteristics of the present adhesive formulations. Thin adherend coupons of 0.063-inch thickness were employed as simple, single overlap shear specimens in accordance with ASTM E96-66 to evaluate bonding strengths. Thick adherend shear specimens of 0.50-inch thickness were used for environmental testing. The thin adherend coupons were made with 7075-T6 aluminum cleaned and treated by phosphoric acid anodizing and then coated with a corrosion resistant primer. The thick adherend coupons were made with 2024-T3 aluminum cleaned, treated and primed in the same manner as the thin coupons.

The following specific examples of the adhesive formulated and evaluated, are intended to illustrate the invention, but not limit it in any way.

EXAMPLE I 320 grams of the bisphenol A epoxy resin (Epon 828) were mixed with 72 grams of the carboxyl terminated butadiene-acrylonitrile rubber (CTBN 1300X8) in a resin reaction kettle. With constant stirring the kettle was heated to 170° C. At 160° C., 0.8 grams of triphenyl phosphene was added and the mixture stirred for one hour with the temperature maintained in the range of 170°–175° C. After being allowed to cool to room temperature, the epoxy-rubber reaction product was mixed with the cycloaliphatic diamine curing agent at a ratio of 10 parts of the reaction product to 2.84 parts of the curing agent.

Very good properties were achieved with this example of the adhesive formulation. The lap shear strengths at −55° C. (−67° F.) room temperature, and 99° C. (210° F.) were 5,350 psi, 4,960 psi, and 2,870 psi, respectively. The peel strength was 24 pounds per inch width. DSC analyses, run at heat-up rates of 2° C. and 10° C. per minute to simulate rate extremes in the field, showed that this formulation cures at a moderate temperature. At the 2° C. rate, the exotherm peak occurs at 80° C.; at the 10° C. rate, the peak occurs at 110° C. TMA analysis of the adhesive formulation after cure at 150° C. (302° F.) shows the adhesive has a glass transition temperature of 120° C.

This formulation has a low enough viscosity to be easily mixed and applied. A rheological analysis was made on the paste adhesive as it was cured by heating from 50° C. at a heat-up rate of 2° C./minute. This is a heat-up rate that can be achieved in the field using conventional heating sources. The viscosity was monitored using the Rheometrics' Dynamic Viscometer. Minimum viscosity was achieved at approximately 90° C. Cure progressed rapidly from that point. In comparison with a currently employed epoxy film adhesive, FM- 300 manufactured by American Cyanamid, the present paste adhesive formulation cures much more rapidly and reaches a much lower viscosity. It reaches a minimum viscosity of approximately 4 poises while FM-300 has a minium viscosity of approximately 500 poises. The lower viscosity reached by the paste adhesive makes it possible to cure it using only contact pressure. Vacuum bag pressure does not appear to be necessary. The viscosity of the paste adhesive can be increased, if necessary, by adding Cab-o-Sil or by using a higher molecular weight epoxy resin, such as Epon 830 or Epon 834 in place of Epon 828, in the rubber-epoxy reaction. The present paste adhesive cures much more rapidly than FM-300. It reaches minimum viscosity approximately 20 minutes after the initiation of cure at 50° C. This is thirty minutes before FM-300 reaches its minimum.

The formulation showed good environmental durability. To test durability three separate evaluations were run. In the first evaluation thick adherend lap shear specimens were exposed to a continuous 1,000 psi tensile stress in a humidity cabinet that was maintained at 140° F., 95 percent RH. After an exposure of 21 days, the specimens were tested to failure in tensile loading at 220 F. Essentially no strength reduction occurred due to the environmental exposure. Unexposed control specimens had a tensile shear strength at 220° F. of 3820 psi (average of 4 specimens). The exposed specimens had a tensile shear strength at 220° F. of 3,740 psi (average of 5 specimens).

In the second durability evaluation, thick adherend lap shear specimens were exposed to a continuous stress of 500 psi in a humidity cabinet at 140° F., 95 percent RH humidity cabinet for 60 days. After 60 days the specimens were tested to failure in tensile loading at 220 F. A strength reduction of 11 percent occurred compared to the unexposed control specimens. This is an acceptable amount of degradation for such a severe test.

In a third durability evaluation, thin adherend lap shear specimens were exposed to 170° F., 95 percent RH for 14 days and then tested to failure at 210° F. A strength reduction of only 1 percent occurred compared to control specimens. The exposed specimens had a lap shear strength of 2,840 psi compared to 2,870 psi for the control specimens.

An analysis was made to determine the effect of reduced amounts of curing agent on lap shear properties. A significantly reduced amount of curing agent will seriously degrade elevated temperature lap shear strength. A 40 percent reduction in curing agent reduces the lap shear strength at 99° C. (210° F.) to below 500 psi.

EXAMPLE II

To 9 parts by weight of the epoxy-rubber reaction product, as formulated and prepared in Example I, 1 part by weight of a trifunctional epoxy resin, commercially available as Type 0510 from Ciba-Geigy Corporation, was added, and the combination was then mixed with the cycloaliphatic diamine curing agent at a ratio of 10:2.36 parts by weight.

Lap shear strengths were 4,690 psi at −55° C., 4,530 psi at room temperature, and 2,770 psi at 121° C. (250° F.), the latter strength being significant at the elevated temperature. Peel strength was 37 pounds per inch width at room temperature. DSC analyses made at 2° C. and 10° C. per minute showed that the present example of the adhesive formulation cures at moderate temperatures with there being two exotherm peaks at 110° C. and 130° C. for the 10° C. rate, and one peak at 80° C. for the 2° C. per minute rate. TMA analysis indicated that the present example has a glass transition temperature of 120° C. It should be noted that increasing the ratio content of the trifunctional epoxy resin from that described was determined to be of little or no advantage, the result of such increased content being to lower the lap shear properties and decrease the viscosity so as to make the adhesive too fluid for easy application.

EXAMPLE III

To 5 parts by weight of the epoxy-rubber reaction product, as formulated and prepared in Example I, an additional 5 parts by weight of the bisphenol A epoxy resin (Epon 828), a difunctional epoxy, was added thereby lowering the overall rubber content of the adhesive formulation. A quantity of the cycloaliphatic diamine curing agent was then added to the modified epoxy-rubber reaction product, the parts-by-weight ratio of the epoxy-rubber product to diamine being 10:2.53.

The adhesive strength of this formulation was somewhat lower, approximately 4,300 psi, at room temperature, while the elevated temperature strengths were increased, the lap shear strengths at 99° C. and 115° C. being in the range of 2,500−3,200 psi. DSC analyses at the 2° C. and 10° C. heat-up rates showed exotherm peaks at about 77° C. and about 112° C., respectively. The glass transaction temperature of the cured adhesive formulation was 130° C.

EXAMPLE IV

To 5 parts by weight of the epoxy-rubber reaction product of Example I, 1 part by weight of an aromatic amine (Epon Z) was added as the curing agent. This adhesive formulation provided essentially equivalent results as that of Example I. Lap shear strengths at −55° C., room temperature, 99° C. and 121° C. were 5,570 psi, 5,120 psi, 3,130 psi, and 2,370 psi, respectively. Peel strength was 37 pounds per inch width.

DSC analyses showed somewhat higher curing temperatures for this formulation. The DSC peak at the 2° C./minute rate was 115° C., while at the 10° C./minute rate, the exotherm peak occurred at 155° C. The glass transition temperature as measured by TMA is about 100° C., surprisingly low considering the good lap shear strengths at 99° C. and 121° C.

EXAMPLE V

To 10 parts by weight of the epoxy-rubber reaction product formulated and prepared in Example I, 1 part by weight of a tetrafunctional epoxy resin, commercially available as MY-720 from the Ciba-Geigy Corporation, was added, and the combination was then mixed with the aromatic amine curing agent (Epon Z) at a ratio of 11:2.46 parts by weight.

The lap shear strengths of this formulation were 4,380 psi at room temperature and 3,720 psi at 99° C., the latter strength showing significant improvement over previous formulations. DSC analysis shows this formulation cures at substantially the same temperature as Example IV, the peak exotherm being at approximately 150° C. at the 10° C./minute heat-up rate. The glass transition temperature is approximately 140° C. as measured by TMA.

EXAMPLE VI

To 5 parts by weight of the epoxy-rubber reaction product of Example I, 1 part by weight of an adduct formed between the aromatic amine curing agent metaphenylene diamine (MPDA) and the bisphenol A epoxy resin was added. The adduct was prepared by reacting 100 grams of the metaphenylene diamine with 30 grams of the epoxy resin at 100° C. for 30 minutes.

Lap shear strengths at −55° C., room temperature, 99° C., and 121° C. were 4,580 psi, 5,360 psi, 3,320 psi, and 1,790 psi, respectively. DSC analyses show the formulation cures at an acceptable temperature with exotherm peaks at 105° C. and 150° C. for the 2° C. and 10° C. per minute heat-up rates, respectively. TMA analysis shows the formulation has a glass transition temperature of 120° C.

For further information, particularly regarding the evaluation and analyses of the above-described examples of the present adhesive formulation, see Crabtree, D. J. *Adhesives for Field Repair of Graphite/Epoxy Composite Structures* (N.T.I.S. Accession No. AD-A107 870/8, abstracted Mar. 26, 1982).

Therefore, it is now apparent that the disclosed invention provides an improved epoxy-based adhesive composition for bonding graphite-epoxy composite structures, being particularly effective for performing patch-bonding repairs on the damaged areas of such composite structures, especially those of aircraft. In addition, the disclosed rubber-modified epoxy adhesive, formulated as a two-part system, has an extended shelf life of at least one year without requiring refrigerated storge, and is curable under somewhat limited conditions of time, temperature and pressure without difficult or dangerous-to-use curing equipment. Furthermore, in its cured state, the described rubber-modified epoxy adhesive is thermally stable, environmentally durable, and possessed of sufficient mechanical properties to function effectively as a load transfer medium in the repair of joints of graphite-epoxy composites.

It will be appreciated that various modifications of the present invention may be made within the ordinary skill in the art in light of the above teachings, and that the invention is not limited to the specific details shown in the Examples. It is therefore to be understood that, within the scope of the appended claims, the invention may be practiced otherwise than as specifically described.

What is claimed is:

1. An adhesive composition, comprising:
    a reaction product consisting essentially of a bisphenol A epoxy resin and a carboxyl terminated butadiene-acrylonitrile rubber mixed in the ratio of about 4:1 parts by weight of said epoxy resin to said rubber, said reaction product being characterized by linear epoxy-rubber chains produced by a carboxyl-epoxide reaction; and
    a curing agent consisting essentially of a cycloaliphatic diamine composed of bis (p-aminecyclohexyl) methane isomers, the ratio of said reaction product to said curing agent being in the range of 3.5–5.0:1.

2. An adhesive composition according to claim 1, further comprising:
    a catalyst consisting essentially of triphenyl phosphene in a sufficient amount to accelerate the carboxyl-epoxide reaction of said reaction product.

3. An adhesive composition according to claim 2, further comprising:
    an additional epoxy resin selected from the group consisting of trifunctional and tetrafunctional epoxy resins in a sufficient amount to increase the thermal stability of the composition.

4. An adhesive composition according to claim 3 wherein said additional epoxy resin is a trifunctional epoxy resin.

5. An adhesive composition according to claim 3 wherein said additional epoxy resin is a tetrafunctional epoxy resin.

6. A method of preparing a rubber-modified epoxy adhesive, comprising the steps of:
    reacting a bisphenol A epoxy resin with a carboxyl terminated butadiene-acrylonitrile rubber, the ratio of the resin to the rubber being about 4:1, to produce a reaction product having linear epoxy-rubber chains; and
    mixing the reaction product with a curing agent of a cycloaliphatic diamine composed of bis (p-aminecyclohexyl) methane isomers, the ratio of the reaction product to the curing agent being in the range of 3.5–5.0:1.

7. A method of preparing an adhesive according to claim 6, wherein said step of reacting comprises:
    mixing the resin and the rubber in proper ratio;
    heating the resin and rubber mixture to about 170° C.;
    stirring the mixture constantly while heating;
    adding a small quantity of triphenyl phosphene as a catalyst to accelerate the reaction product;
    stirring for one hour after adding the phosphene catalyst, the temperature being maintained in the range of 170°–175° C.; and
    cooling the reaction product to room temperature.

8. A method of preparing an adhesive according to claim 7, further comprising:
    blending an additional epoxy resin selected from the group consisting of trifunctional and tetrafunctional epoxy resins in a sufficient amount to increase the thermal stability of the adhesive.

* * * * *